United States Patent
Huston (10) Patent No.: US 9,445,225 B2
(45) Date of Patent: Sep. 13, 2016

(54) GPS BASED SPECTATOR AND PARTICIPANT SPORT SYSTEM AND METHOD

(75) Inventor: Charles D. Huston, Austin, TX (US)

(73) Assignees: Huston Family Trust, Grant Island, NE (US); Herb's Holdings LLC., Lincoln, NE (US)

( * ) Notice: Subject to any disclaimer, the term of this patent is extended or adjusted under 35 U.S.C. 154(b) by 799 days.

(21) Appl. No.: 12/111,688

(22) Filed: Apr. 29, 2008

(65) Prior Publication Data
US 2008/0198230 A1    Aug. 21, 2008

Related U.S. Application Data

(63) Continuation-in-part of application No. 11/875,414, filed on Oct. 19, 2007, which is a continuation-in-part of application No. 11/624,998, filed on Jan. 19, 2007, which is a continuation-in-part of application No.
(Continued)

(51) Int. Cl.
*H04B 1/38*     (2015.01)
*H04W 4/02*    (2009.01)
(Continued)

(52) U.S. Cl.
CPC ............... *H04W 4/02* (2013.01); *H04L 67/18* (2013.01); *G01S 19/19* (2013.01)

(58) Field of Classification Search
CPC ........ G06F 3/011; G06F 3/005; G06F 1/163; G06F 3/0425; G06F 2200/1614; G02B 2027/014; G06Q 50/01; G06T 19/006; G06T 19/00; G09G 5/377
USPC ........ 455/404.2, 456.1–456.6; 345/659, 633; 348/157
See application file for complete search history.

(56) References Cited

U.S. PATENT DOCUMENTS 5,364,093 A    11/1994    Huston et al.
5,802,492 A     9/1998    DeLorme et al.
(Continued)

FOREIGN PATENT DOCUMENTS

EP    1077421    2/2001
EP    1113669    7/2001
(Continued)

OTHER PUBLICATIONS

Barstow et al., "Personalized Interactive Real-Time Sports Reporting Using Java," American Programmer, Jan. 1997, pp. 32-37.
(Continued)

*Primary Examiner* — Kiet Doan
*Assistant Examiner* — Edward Zhang
(74) *Attorney, Agent, or Firm* — Egan Peterman Enders Huston (57) ABSTRACT

A spectator sport system and method that displays different views of a sporting event and, in particular, uses a position selected by the spectator to assist in displaying a view from the selected position. The spectator, using an internet device, can zoom, pan, tilt and change the view, as well as change the view to another position, such as a finish line, goal, or a participant position (e.g. Driver of car #3 or Tiger Wood's position). The starting position can be specified, as well as the target position or orientation from the starting position. Vital information on the sporting event or a participant can be appended to the view. In some forms, augmented reality or any geographic referenced datasets can be used and combined, such as 3D imagery or 3D renderings, to enhance the experience.

28 Claims, 6 Drawing Sheets

Related U.S. Application Data

11/456,715, filed on Jul. 11, 2016, now Pat. No. 7,855,638, and a continuation-in-part of application No. 11/456,723, filed on Jul. 11, 2006, now Pat. No. 7,518,501.

(60) Provisional application No. 60/699,205, filed on Jul. 14, 2005.

(51) Int. Cl.
   *H04L 29/08* (2006.01)
   *G01S 19/19* (2010.01)

(56) References Cited

U.S. PATENT DOCUMENTS

| | | | |
|---|---|---|---|
| 5,913,918 A | 6/1999 | Nakano et al. | |
| 6,115,177 A | 9/2000 | Vossler | |
| 6,166,679 A | 12/2000 | Lemelson et al. | |
| 6,195,090 B1 | 2/2001 | Riggins, III | |
| 6,199,015 B1 | 3/2001 | Curtwright et al. | |
| 6,317,127 B1 | 11/2001 | Daily et al. | |
| 6,330,356 B1 | 12/2001 | Sundareswaran et al. | |
| 6,409,607 B1 | 6/2002 | Libit et al. | |
| 6,411,266 B1 * | 6/2002 | Maguire, Jr. | 345/8 |
| 6,452,544 B1 | 9/2002 | Hakala et al. | |
| 6,578,203 B1 | 6/2003 | Anderson, Jr. et al. | |
| 6,671,390 B1 | 12/2003 | Barbour et al. | |
| 6,721,542 B1 | 4/2004 | Anttila et al. | |
| 6,744,403 B2 | 6/2004 | Milnes et al. | |
| 6,801,516 B1 | 10/2004 | Lomp et al. | |
| 6,879,443 B2 | 4/2005 | Spitzer et al. | |
| 6,885,652 B1 | 4/2005 | Ozukturk et al. | |
| 6,894,994 B1 | 5/2005 | Grob et al. | |
| 6,909,738 B2 | 6/2005 | Akopian et al. | |
| 6,917,644 B2 | 7/2005 | Cahn et al. | |
| 6,920,328 B2 | 7/2005 | Wollrab | |
| 6,996,402 B2 | 2/2006 | Logan et al. | |
| 7,002,551 B2 | 2/2006 | Azuma et al. | |
| 7,031,728 B2 | 4/2006 | Beyer, Jr. | |
| 7,053,780 B1 | 5/2006 | Straub et al. | |
| 7,123,215 B2 | 10/2006 | Nakada | |
| 7,209,035 B2 | 4/2007 | Tabankin et al. | |
| 7,317,705 B2 | 1/2008 | Hanson | |
| 7,353,034 B2 | 4/2008 | Haney | |
| 7,441,198 B2 | 10/2008 | Dempski et al. | |
| 7,546,317 B1 | 6/2009 | Kaptelinin | |
| 7,593,687 B2 | 9/2009 | Anderson, Jr. et al. | |
| 7,716,283 B2 | 5/2010 | Thukral | |
| 7,796,155 B1 * | 9/2010 | Neely, III | G06K 9/00771 345/418 |
| 7,812,766 B2 | 10/2010 | Leblanc et al. | |
| 8,172,702 B2 | 5/2012 | Meadows et al. | |
| 2002/0038178 A1 | 3/2002 | Talkenberg et al. | |
| 2002/0094853 A1 | 7/2002 | Hayashi | |
| 2002/0154174 A1 | 10/2002 | Redlich et al. | |
| 2002/0188678 A1 | 12/2002 | Edecker et al. | |
| 2003/0032436 A1 | 2/2003 | Mikuni | |
| 2003/0038892 A1 | 2/2003 | Wang et al. | |
| 2003/0109322 A1 | 6/2003 | Funk et al. | |
| 2003/0149496 A1 | 8/2003 | Johnson | |
| 2003/0156134 A1 | 8/2003 | Kim | |
| 2003/0174178 A1 | 9/2003 | Hodges | |
| 2003/0187730 A1 * | 10/2003 | Natarajan et al. | 705/14 |
| 2003/0189589 A1 * | 10/2003 | LeBlanc et al. | 345/723 |
| 2003/0194685 A1 | 10/2003 | Adams | |
| 2004/0036622 A1 | 2/2004 | Dukach et al. | |
| 2004/0051680 A1 * | 3/2004 | Azuma et al. | 345/8 |
| 2004/0104935 A1 | 6/2004 | Williamson et al. | |
| 2004/0147329 A1 * | 7/2004 | Meadows et al. | 473/131 |
| 2004/0161246 A1 | 8/2004 | Matsushita et al. | |
| 2005/0001852 A1 * | 1/2005 | Dengler et al. | 345/633 |
| 2005/0078195 A1 | 4/2005 | VanWagner | |
| 2005/0107952 A1 | 5/2005 | Hoshino et al. | |
| 2005/0143096 A1 | 6/2005 | Boesch | |
| 2005/0148388 A1 | 7/2005 | Vayra et al. | |
| 2005/0207617 A1 * | 9/2005 | Sarnoff | 382/103 |
| 2005/0250458 A1 | 11/2005 | Graham et al. | |
| 2005/0259002 A1 | 11/2005 | Erario et al. | |
| 2006/0015923 A1 | 1/2006 | Chuah et al. | |
| 2006/0075445 A1 | 4/2006 | O'Kane | |
| 2006/0104600 A1 | 5/2006 | Abrams | |
| 2006/0105857 A1 | 5/2006 | Stark | |
| 2006/0136173 A1 * | 6/2006 | Case et al. | 702/182 |
| 2006/0195361 A1 | 8/2006 | Rosenberg | |
| 2006/0262140 A1 | 11/2006 | Kujawa et al. | |
| 2006/0284791 A1 | 12/2006 | Chen et al. | |
| 2007/0024527 A1 | 2/2007 | Heikkinen et al. | |
| 2007/0060408 A1 | 3/2007 | Schultz et al. | |
| 2007/0103292 A1 | 5/2007 | Burkley et al. | |
| 2007/0150444 A1 | 6/2007 | Chesnais et al. | |
| 2007/0179792 A1 | 8/2007 | Kramer | |
| 2007/0191020 A1 | 8/2007 | Fischer et al. | |
| 2007/0255831 A1 | 11/2007 | Hayashi et al. | |
| 2007/0265089 A1 * | 11/2007 | Robarts et al. | 463/42 |
| 2007/0282688 A1 | 12/2007 | Buhrow et al. | |
| 2008/0194323 A1 | 8/2008 | Merkli et al. | |
| 2009/0054084 A1 | 2/2009 | Buhrke et al. | |
| 2009/0094106 A1 | 4/2009 | Porter et al. | |
| 2011/0305369 A1 | 12/2011 | Bentley et al. | |

FOREIGN PATENT DOCUMENTS

| | | | |
|---|---|---|---|
| EP | 1113669 A2 * | 7/2001 | H04N 7/24 |
| EP | 1262213 | 12/2002 | |
| JP | 10-154242 | 6/1998 | |
| KR | 10-2004-0047692 | 6/2004 | |
| KR | 10-2005-0055506 | 6/2005 | |
| WO | 01/05476 | 1/2001 | |
| WO | 01/36061 | 5/2001 | |

OTHER PUBLICATIONS

International Search Report, PCT/US2006/027218, mailed Feb. 12, 2007.
O'Malley et al., "Human Activity Tracking for Wide-Area Surveillance," University of Florida, Department of Electrical and Computer Engineering, May 2002, 7 pages.
Office Action mailed Apr. 14, 2009 for U.S. Appl. No. 11/456,715.
Final Office Action mailed Dec. 28, 2009 for U.S. Appl. No. 11/456,715.
Office Action mailed Mar. 16, 2010 for U.S. Appl. No. 11/456,715.
Notice of Allowance mailed Oct. 4, 2010 for U.S. Appl. No. 11/456,715.
Office Action mailed Apr. 17, 2008 for U.S. Appl. No. 11/456,723.
Final Office Action mailed Oct. 1, 2008 for U.S. Appl. No. 11/456,723.
Notice of Allowance mailed Dec. 15, 2008 for U.S. Appl. No. 11/456,723.
Office Action mailed Oct. 6, 2009 for U.S. Appl. No. 11/624,998.
Office Action mailed Apr. 14, 2010 for U.S. Appl. No. 11/624,998.
Office Action mailed Sep. 1, 2010 for U.S. Appl. No. 11/624,998.
Office Action mailed Feb. 15, 2011 for U.S. Appl. No. 11/624,998.
Office Action mailed Jun. 14, 2011 for U.S. Appl. No. 11/624,998.
Final Office Action mailed Nov. 7, 2011 for U.S. Appl. No. 11/624,998.
Office Action mailed Oct. 6, 2009 for U.S. Appl. No. 11/875,414.
Final Office Action mailed Jun. 22, 2010 for U.S. Appl. No. 11/875,414.
Office Action mailed Dec. 21, 2010 for U.S. Appl. No. 11/875,414.
Final Office Action mailed Jun. 9, 2011 for U.S. Appl. No. 11/875,414.
Office Action mailed Mar. 27, 2012 for U.S. Appl. No. 11/875,414.
Office Action mailed Mar. 4, 2011 for U.S. Appl. No. 12/146,907.
Final Office Action mailed Jun. 13, 2011 for U.S. Appl. No. 12/146,907.
Office Action mailed Jan. 4, 2012 for U.S. Appl. No. 12/146,907.
Notice of Allowance mailed Mar. 9, 2012 for U.S. Appl. No. 12/146,907.
Office Action mailed Jan. 3, 2012 for U.S. Appl. No. 13/188,030.
Office Action mailed Sep. 10, 2012 for U.S. Appl. No. 13/182,930.

(56) References Cited

OTHER PUBLICATIONS

Office Action mailed Aug. 29, 2012 for U.S. Appl. No. 13/188,030.
Office Action mailed Aug. 20, 2012 for U.S. Appl. No. 13/423,423.
Office Action mailed Mar. 7, 2013 for U.S. Appl. No. 13/182,914.
Office Action mailed Feb. 12, 2013 for EP Application No. 06787161.6.
Final Office Action mailed Apr. 8, 2013 for U.S. Appl. No. 13/182,930.
Office Action mailed Nov. 22, 2012 for pending KR Application No. 10-2008-7003027.
Notice of Allowance mailed Aug. 6, 2013 for U.S. Appl. No. 13/605,174.
Office Action mailed Aug. 20, 2013 for U.S. Appl. No. 13/423,423.
Office Action mailed Sep. 25, 2013 for U.S. Appl. No. 13/182,930.
Final Office Action mailed Sep. 30, 3013 for U.S. Appl. No. 13/182,914.
Final Office Action mailed Jun. 30, 2014 for U.S. Appl. No. 13/182,930.
Office Action mailed Mar. 19, 2014 for U.S. Appl. No. 13/182,914.
Notice of Allowance mailed May 18, 2014 for U.S. Appl. No. 13/423,423.
Final Office Action mailed Feb. 6, 2013 for pending U.S. Appl. No. 13/423,423.
Office Action mailed Jan. 22, 2015 for U.S. Appl. No. 13/182,914.

* cited by examiner

GPS BASED SPECTATOR AND PARTICIPANT SPORT SYSTEM AND METHOD

PRIORITY CLAIM

This application is a continuation-in-part of the following: U.S. patent application Ser. No. 11/875,414 filed Oct. 19, 2007 which is a continuation-in-part of U.S. patent application Ser. No. 11/624,998 filed Jan. 19, 2007 which is a continuation-in-part of U.S. patent application Ser. Nos. 11/456,715 and 11/456,723 filed Jul. 11, 2006 both of which claim priority to U.S. Provisional Application No. 60/699,205 filed Jul. 14, 2005; all of which are incorporated herein by reference, and the benefit of 35 U.S.C. §120 is claimed.

BACKGROUND

1. Field of the Invention

This invention relates generally to a spectator sport system that displays different views of the event and, in particular, uses a spectator's selected source position to assist in displaying a view.

2. Description of Related Art

GPS systems have been used in sports by participants in contests where position, location and distance to features are important. For example, U.S. Pat. No. 5,364,093 describes a GPS system and method for allowing a golfer to tell distance to a hole or other feature, and permits the course to track and manage golfers on the course. NASCAR with Sportsline has developed a GPS system mounted to cars for TV viewers to monitor a race.

GPS systems are becoming much more accurate, inexpensive and robust. GPS antennas and engines are fairly inexpensive and accurate with WAAS to less than 2 meters. At a sporting arena, the accuracy can be improved to centimeters, depending on the accuracy required, latency constraints, processing and bandwidth available, etc. Further, communication links are becoming very inexpensive and high bandwidth. For example, WiFi (802.11g) has modems with network signals approaching a 1 mile range, cost less than $5, with bandwidth of 54M bit/sec. Wi-max (802.16) has network signals approaching 30 miles with data rates as high as 70M bit/sec, but is more relevant to fixed installations Future versions of WiFi or other radio technology might be less than $1 with 10-100× bandwidths within a few years (as used herein WiFi refers to current and future versions of wireless local area networks (WLAN) based on the IEEE 802.11 specifications). Other radio technologies are also promising in many applications, such as Zigbee and Ultrawideband.

What has not been done is an integrated GPS system for spectators to more fully enjoy a sport particularly at a remote location. For example, at a NASCAR race, the TV or radio viewing location limits his view of the race and is not his own unique perspective. While watching a race, the spectator might listen to a radio or watch a portable TV, but the perspective is the announcer's or TV angle. Such divergent perspectives—announcer versus personal—can be confusing. Further, a remote spectator might be most interested in the cars he is interested in—the ones near the $3^{rd}$ turn. Other sports would benefit from a system that allows a spectator to more fully integrate the contest information with his desired viewing perspective. In addition to auto racing, football, yachting, horse racing, golf, hockey or any motor sport are candidates for the system and method hereof, especially as size and weight of GPS and radios accompanying a participant decreases.

U.S. Pat. No. 6,744,403 describes a GPS system for tracking objects, such as cars, at a sporting event. See also, U.S. Pat. No. 6,195,090; U.S. Patent Application Publication No. 2006/0105857; U.S. Patent Application Publication No. 2005/0259002. High data rate packet transmission is known, such as U.S. Pat. Nos. 6,894,994; 6,909,738; 6,885,652; 6,917,644; and 6,801,516. Examples of user interfaces, such as PDAs, cell phones, headsets, and the like are described, for example, in U.S. Pat. Nos. 7,053,780; 6,879,443; and 6,115,177. All references cited herein are incorporated by reference.

SUMMARY OF THE INVENTION

The present invention contemplates a GPS system that provides contest information relevant to the viewer's selected perspective or location or is selectable to view the contest to another location or target. Preferably, the participants are GPS equipped and communicate their GPS position (and other sensor information) with a server. The remote spectators have an internet viewing device that accepts the participants position and selectively renders a view of the contest (and/or other information) from the spectators selected perspective or location to a selected target or orientation. Remote spectators can use the internet device with a network information feed to obtain views of interest.

For example, in a NASCAR race, the cars are all equipped with a GPS engine and a communication link to a central server. Each spectator has an internet device has a communication link to the central server. The internet device logs in with the central server, optionally authenticating and telling the server the spectator's selected location and optionally a target location or orientation. During the race, the positions of the cars are broadcast to the spectator's internet device. In one mode, the internet device displays information most relevant to the spectator's selected source location. For example, the position and vital information of the cars nearest the spectator's selected location. In another mode, the internet device has the processing power to take the positions of the cars and the location of the spectator's selection and render a depiction of the cars in real time on the track. The spectator can select the view. For example, the spectator might select "finish line," "overhead," "car 3 driver's view," or "my view."

A spectator might designate the 3rd turn as "my view" selected to see the perspective of the rendering on the internet device to match a view from the 3rd turn—i.e. the source location including elevation. This adds to a much greater enjoyment of the contest because visual data is added to the display which matches the spectator's desired observation. Importantly, the spectator can not only switch views and source locations, but can also tilt or pan the perspective or observation point or zoom. That is, from "my view" the spectator might rotate a toggle up incrementally up (or down) from the horizontal view from the spectator's selected location of the car positions to a vertical view of the contest. Preferably, the toggle would also allow left/right pan at any time.

In addition to the view of the vehicles (or contestants) the spectator can selectively view appended important information. For example, in one mode the user might select no information, in a second mode, the user might select car identification only, while in another mode, the user might select identification plus speed, plus acceleration of one or more selected cars. Other information from car sensors are possible (or derived from GPS information) such as linear or radial G, engine or tire condition, fuel state, etc. Preferably, the spectator could go from a view mode to other modes, such as a display of the current information of the cars in tabular form, a view from a particular camera (streaming video), pit video or rendering, etc. Preferably, the internet device could include a radio (such as WiFi, Zigbee, Ultrawideband, or WiMax) to relay other information such as audio for monitoring car or pit communications or radio broadcasts, or even streaming video of TV broadcasts in, e.g. a separate window.

In "my view," for example, the portable device might display only information to the 3rd turn selected position for cars nearest the 3rd turn. Alternatively, the spectator might want to follow a particular car continuously, e.g. follow car number 8, with selectable views (overheard, turns, stands, head, driver's view). In any of these modes, the spectator could zoom, pan or tilt as described above, freeze, slow motion, replay, etc. In many instances, the spectator might want to view the event from a position of a participant.

While the preferred embodiment is described in the context of a car race such as NASCAR, IRL, NHRA, CART, Formula One, it is easily seen how the system and method of the present invention is applicable to a wide variety of spectator sports. Auto, aircraft, motorcycle, bicycle, boat racing, horse racing, football, soccer and hockey are just a few examples. Even hunting or fishing tournaments or TV shows would benefit from the system and method hereof. For example, a golf spectator (on the course or at home) might use the internet device to follow a particular golfer during a round. Information on the position of the player's golf ball can be supplied from a variety of sources—currently the PGA uses triangulation to acquire the data during play and provides the golf ball position information on its web site. However, the information could easily be gathered by a portable GPS unit accompanying the golfer's caddy or other dedicated data gatherer accompanying the golfer. Once the golf ball position information of each player is gathered, the information is distributed to the spectator based on the spectator's desires. As may be surmised from the NASCAR description above, the golf spectator might select the source viewing position and the target or orientation, determine the angle or view of the graphic rendering, the tilt, pan or zoom of the graphic depiction, the format of the presentation, i.e. graphic of a hole or a tabular summary of all golfers, or one golfer, statistics for a location or hole, etc.

While one limitation to the applicability of the present invention to a spectator sport is the ability to determine the position of a participant, those limitations are becoming less meaningful as technology progresses. For example, with current technology a football player can be fitted with a GPS device and radio that weighs less than ½ pound and is accurate within 2 meters. Foreseeable technology will enable such a device weighing several ounces (mostly battery weight), accurate with WAAS to less than 1 meters and with post-processing to centimeter accuracy. Accuracy to GPS positioning in an outdoor, unobstructed, clutter-free environment will soon be better than one meter. Post-processing at the server can occur in real time (or near real time) to achieve the desired participant accuracy. While the preferred embodiment contemplates obtaining participant location information via GPS, other types of location determination sensors are possible, such as proximity sensors, radar or radio triangulation. See, e.g., U.S. Pat. No. 5,564,698 for tracking hockey pucks, other objects, or people.

While the internet device of the preferred embodiment is a gaming device with GPS and a radio (e.g., WiFi or Zigbee) other types of personal computers, gaming, PDA, and cell phones may equally be used. Further, although a preferred embodiment contemplates broadcasting participant location information to spectators by radio, another preferred embodiment broadcasts information to spectators over the internet. The rendering load of the data might be distributed, i.e., some of the graphics pipeline for the rendering could be accomplished at the server before transmission; other rendering can be performed on the internet device. However, rendering technology is rapidly advancing and becoming increasingly realistic with advances in game technology and as the processing power of the internet device increases and the rendering technology develops, it is anticipated that most of the graphics rendering can be performed at the internet device.

DESCRIPTION OF PREFERRED EMBODIMENTS

Figure 1:
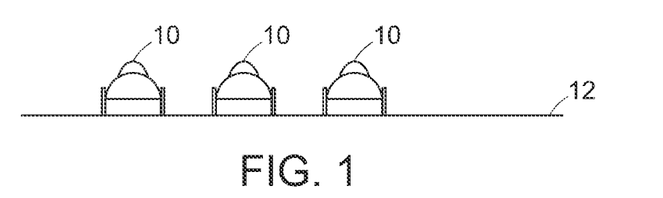
FIG. 1 is a diagram of a screen shot from the internet device showing a head on view of cars on a track.
Figure 2:
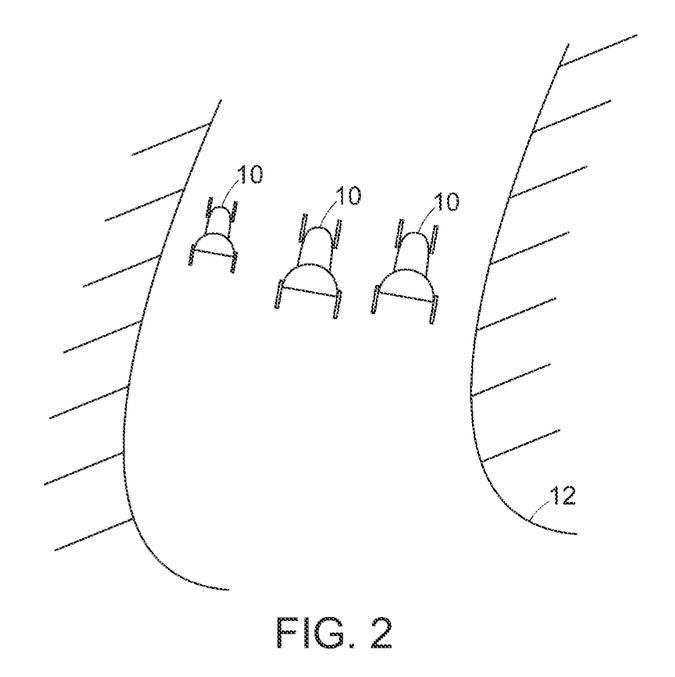
FIG. 2 is a diagram of a screen shot from the internet device showing the cars of FIG. 1 with the rendering tilted up.
Figure 3:
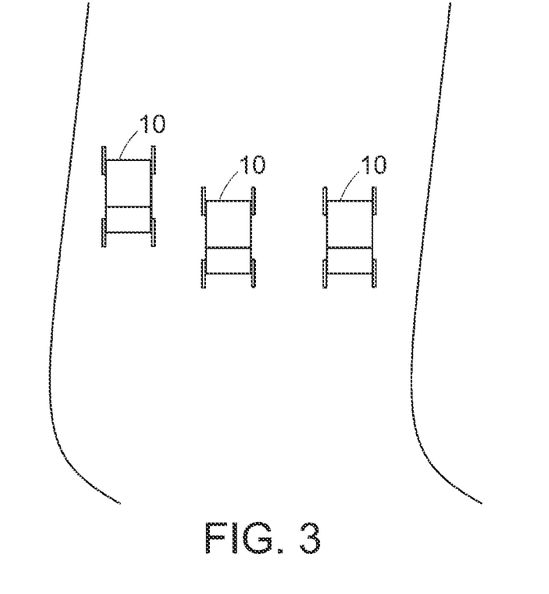
FIG. 3 is a diagram of a screen shot from the internet device showing the cars of FIG. 1 with an overhead view.

Turning to the drawings, cars 10 traverse a track 12. In FIG. 1, the spectator has selected a position at the 3rd turn of an oval track and FIG. 1 is a rendering similar to the spectator's selected view. In FIG. 2, the spectator has tilted upwardly his view so that the spectator has an oblique angle view of the cars 10 of FIG. 1. FIG. 3 is the same depiction of the cars on the track, but the view is further tilted upward to a direct, overhead view of the track 12.

Figure 4:
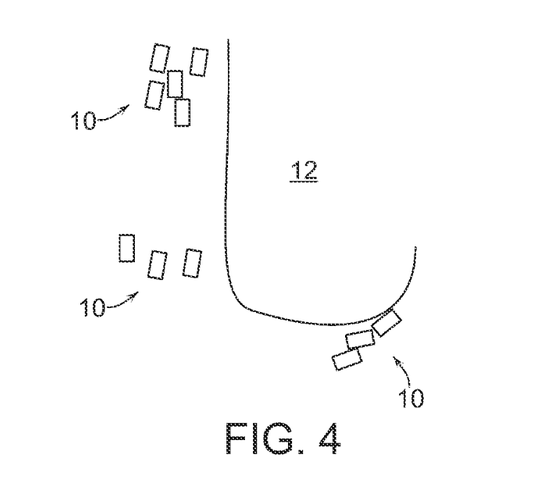
FIG. 4 is a diagram of a screen shot from the internet device showing the cars of FIG. 3 with a zoom out as compared to FIG. 3.
Figure 5:
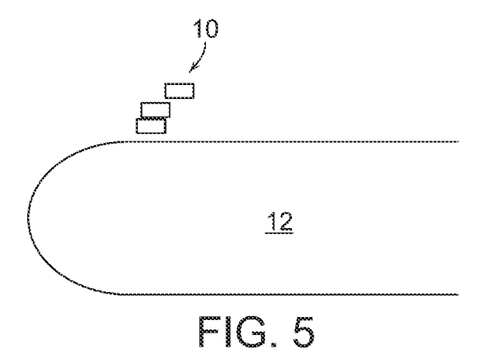
FIG. 5 is a diagram of a screen shot from the internet device showing the cars of FIG. 4 from a different angle or perspective.

FIG. 4 is of a view of the same cars 10 on the track 12 at the same moment in time as FIGS. 1-3, but the view is "zoomed" outwardly changing the scale and allowing the spectator to see more of the cars 10 on the track 12. FIG. 5 is similar in scale to FIG. 4, but the perspective has been changed to the finish line. While the display of the track 12 in FIGS. 1-4 is of an actual race, at time trials the spectator could alternatively obtain from a server a "SimulCam" using technology such as available from Dartfish where each car is superimposed at a certain time into the time trial over the position of other cars.

Of course, other data can be incorporated into the views of FIGS. 4 and 5. In particular, any geographic referenced datasets can be incorporated into a single view which includes aerial or satellite imagery, Street View imagery from Google or Street Level View from Microsoft or Telenav (3D building models), terrain elevation, mapping data or other data such as from Dartfish referenced above. The views, therefore, can be a composite of imagery, virtual (rendered), or augmented reality. The views can be 2D or 3D, and from almost any viewing angle or perspective as described herein. While the cars are displayed in real time (or nearly so), other data or information can be displayed in real time (or nearly so). Typically, each dataset is treated as a layer in a composition of layers, and placed in exact geographic position and scale—so-called "geographic referenced" or "geo-referenced." 3D perspectives of these combined datasets are rendered. The position of the source or starting viewpoint can be selected by the user.

Preferably, the position of the "source" can be specified, e.g. my position or participant's position (driver of car 3). Additionally, the target or direction can be specified. A particular useful sensor augmentation to the GPS information is a "direction" or orientation finder for the device 20. GPS always tells a bearing to a waypoint from a GPS determined location or source. That is, device 20 can give the user a bearing from the current user location (source) to the meeting point location or rendezvous location for one or more friendly participants. GPS information can give direction of travel when the device 20 is moving. When stopped, the orientation of the device 20 relative to the location of another participant or rendezvous location is useful information. So, in addition to the bearing to the rendezvous location the user could know if the device 20 was oriented in the correct direction—i.e. pointed to the rendezvous location or another participant.

Methods are available for determining orientation of a device using GPS, but usually such GPS methods employ multiple antennas. Other means for determining direction are believed to be preferred, such as a fluxgate compass, INS, gyrocompass, digital compass, fluxgate magnetometers, or multi-axis accelerometers to name a few. Preferably, device 20 includes a direction-determining mechanism which is selectable to another location or a designated participant, and tells the user when device 20 is oriented or pointed correctly to a selected target. Alternatively, the user can select the source (e.g. current location) and the target (e.g. car #3). The user can then additionally deviate from a direct line from the source to the target by, for example, moving the elevation.

Figure 6:
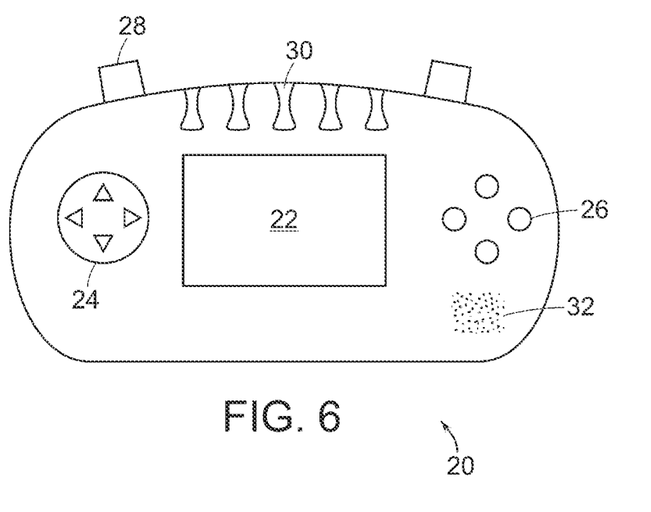
FIG. 6 is a depiction of a portable device.

FIG. 6 is a front elevation of a graphic device 20 carried by the spectators. The depiction is of a gaming device manufactured and sold by Gizmondo, Inc., but other such devices having similar functionality can be substituted. The device 20 includes an LCD screen 22, and an 8 way directional pad 24. Face buttons 26 are near the screen, while triggers 28 are on top of the device 20 as shown. Functional buttons 30 and speaker 32 complete the functional items in the view of FIG. 6. Not shown are the SD card slot, USB or power ports, or a camera. The Gizmondo is powered by a 400 MHz ARM9 processor and has a 2.8 inch 320×240 pixels TFT screen 22 and an NVIDIA 128 bit GeForce 3D 4500 GPU featuring a programmable pixel shader, hardware transform engine, and 1280 KB of embedded memory.

While the device 20 of FIG. 6 uses an ARM 9 processor and Sirf GPS chipset, substitutions can be readily made (e.g. uBlox GPS chipset) as well as substitutions to display 22 and memory capacity. The preferred primary communications radio is GPS tri-band for GPRS but other communication links are easily used. GPRS is a connectivity solution based on Internet Protocols that supports a wide range of enterprise and consumer applications. With throughput rates of up to 40 kbit/s, users have a similar access speed to a dial-up modem, but with the convenience of being able to connect from anywhere. A WiFi communications link can alternatively be used, and encrypted if desired, e.g. using Wired Equivalent Privacy or WEP. Sony, Nintendo, and Playstation all make or intend to make premium game consoles with embedded WiFi. Of course, WiFi outdoors has range issues (although this can be several kilometers with improved antennas and line of sight, particularly at the older 900 MHz bandwidths) and power issues which might make WiFi unsuitable for some applications.

Figure 8:
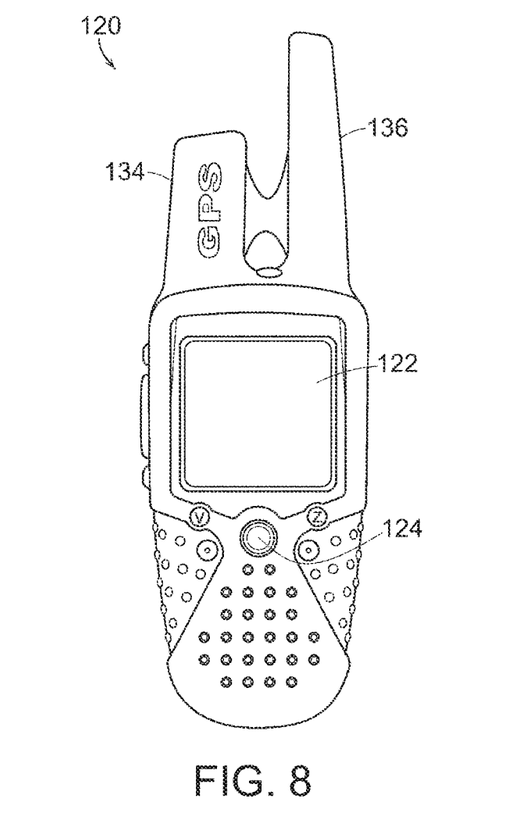
FIG. 8 is a perspective of an alternative embodiment of a portable device, resembling a PDA or a cell phone.
Figure 9:
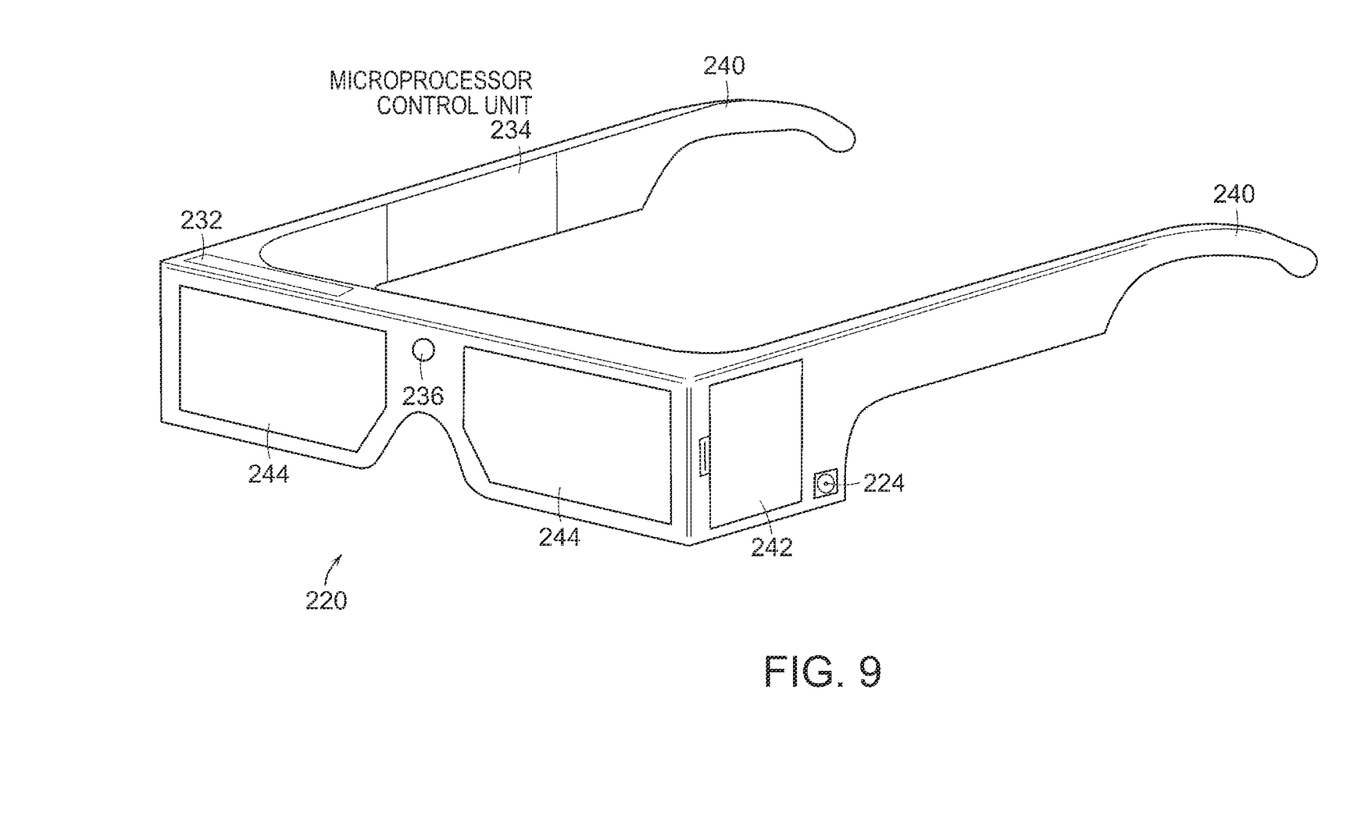
FIG. 9 is a perspective of a portable device where the functionality is built into glasses or goggles worn by the spectator.

FIGS. 8 and 9 each depict an alternative graphic device carried by the spectators. For example, the graphic device 120 of FIG. 8 includes a GPS/antenna 134, communications antenna and radio 136, a display 122, and a directional pad 124. In addition to the Gizmondo type device of FIG. 6, in the near term gaming consoles with GPS and a radio are the best alternatives, such as made by Sony PSP or N Gage OD. However, PDA and cell phone form factors will be viable long term as portable devices, such as Mio A701, HP iPaQ, and Siemens.

Similarly, the graphic device 220 of FIG. 9 is in the configuration of glasses or goggles and includes a GPS and patch antenna 232, microprocessor 234, radio 236. Controls, such as the directional pad 224, are on the side frames (opposite side not shown, but analogous to FIG. 6). Batteries are stored in compartment 242. The displays are transparent LCD's as at 244. Examples of such a device are the MyVue headset made by MicroOptical Corp. of Westwood, Mass. (see, U.S. Pat. No. 6,879,443). A particular benefit of the use of wearable glasses such as the embodiment of FIG. 9 is the ability to incorporate augmented reality, e.g. point of interest overlays. The yellow first down marker in football television broadcasts is an example. In this embodiment, a finish line or other point of interest overlays or markers can be highlighted, or a particular participant, or statistics on a particular participant can be viewed. In the NASCAR example, a spectator wearing the FIG. 9 glasses could see the cars, "augmented" track data (finish line) and selectively highlight a particular car and statistics for that car (e.g. fuel remaining, lap time, time back or ahead, mile per hour, miles remaining, etc.) See, e.g., U.S. Pat. Nos. 7,002,551; 6,919, 867; 7,046,214; 6,945,869; 6,903,752; 6,317,127 (herein incorporated by reference).

As used herein, GPS is meant to include all of the current and future positioning systems that include satellites, such as the U.S. Navistar, GLONASS, Galileo, EGNOS, WAAS, MSAS, QZSS, etc. The accuracy of the positions, particularly of the participants, can be improved using known techniques, often called differential techniques, such as WAAS (wide area), LAAS (local area), Carrier-Phase Enhancement (CPGPS), Wide Area GPS Enhancement (WAGE), or Relative Kinematic Positioning (RKP). Even without differential correction, numerous improvements are increasing GPS accuracy, such as the increase in the satellite constellation, multiple frequencies ($L_1$, $L_2$, $L_5$), modeling and AGPS improvements, software receivers, and ground station improvements. Of course, the positional degree of accuracy is driven by the requirements of the application. In the NASCAR embodiment of the preferred embodiment, two meter accuracy provided by WAAS would normally be acceptable.

Figure 7:
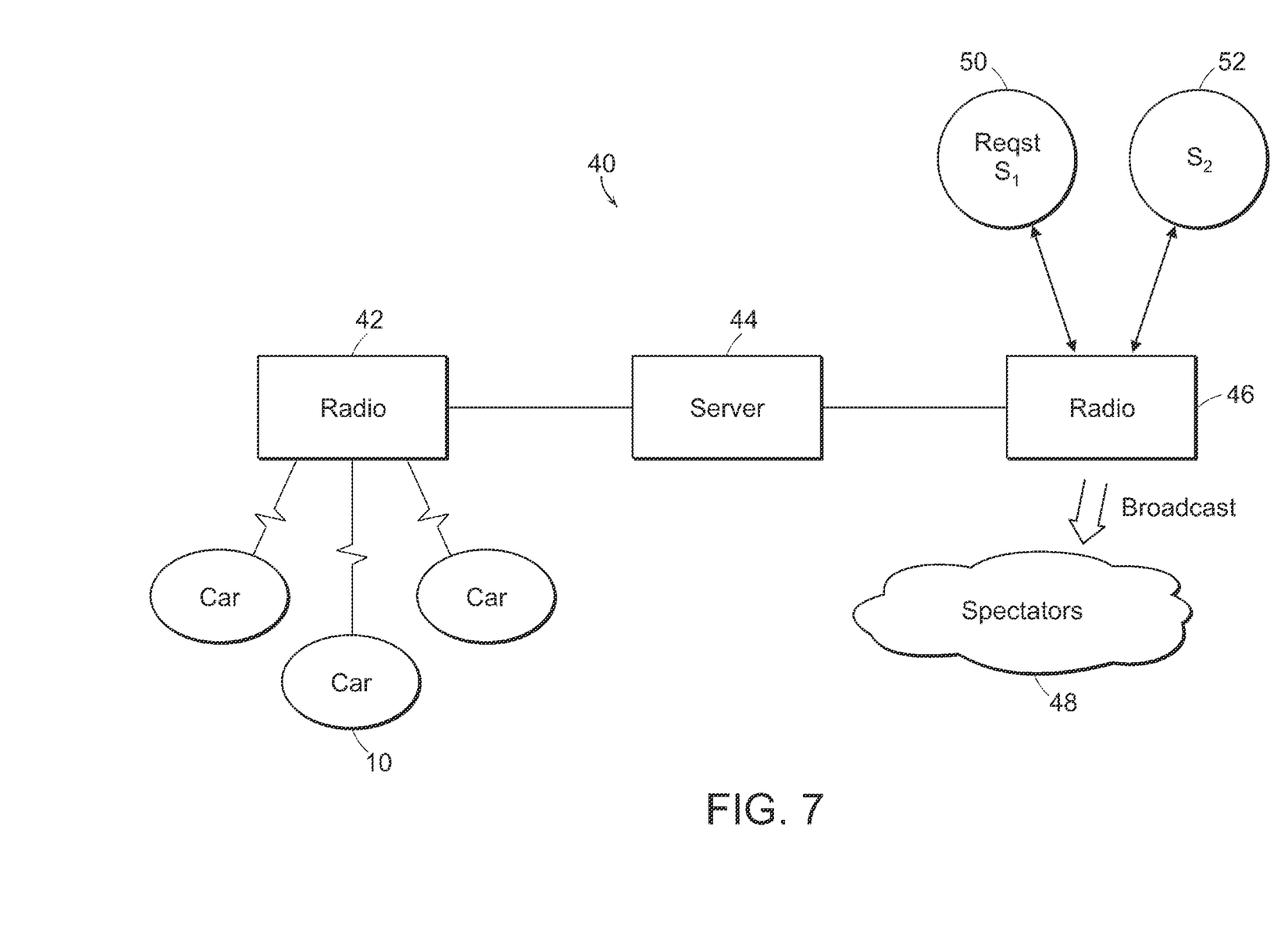
FIG. 7 is a block diagram depicting the network at a racetrack.

In FIG. 7, a depiction of the network 40 is shown. The cars 10 communicate with a radio base station 42 preferably using spread spectrum radio (encrypted or secured if desired). A spread spectrum radio such as made by Freewave Technologies of Boulder, Colo. is a preferred choice (e.g. a 900 MHz board level module). The server 44 stores the position data of each car 10 communicated to the base station 42, and other pertinent data such as car sensor data, etc. Ideally, the server 44 can also digitally store the voice communications of interest (e.g. pit to driver) and video clips of various scenes of possible interest. Of course, the server 44 can store advertising messages as well for delivery to spectators. The server 44 can also be used for authentication of graphic devices 20 and enable selectable purchases from spectators (i.e. refreshments or memorabilia for delivery). The server 44 can also process the incoming position data to increase the accuracy if desired. For example, the server 44 can include its own base station GPS and apply a correction to a participant's position if desired. In some sports, the participants might broadcast location information directly to spectators, i.e. without an intervening server. The radio 46 is used to communicate on a broadcast basis to all spectators 48—here using a GSM tri-band, the GPS position information of the cars 10 (encrypted or secured if desired). The devices 20 in the hands of the spectators 48 processes the position information to render the views illustrated for example in FIGS. 1-5.

While the preferred embodiment contemplates most processing occurring at device 20, different amounts of preprocessing of the position data can be processed at the server 44. For example, the participant information can be differentially corrected at the server (using e.g. either WAAS or a local area differential correction) or even information post-processed with carrier phase differential to achieve centimeter accuracy. Further, it is anticipated that most of the graphics rendering can be accomplished at the portable device 20, but an engineering choice would be to preprocesses some of the location and rendering information at the server 44 prior to broadcast.

Graphics

The graphics generated on the screen 22 can be 2D graphics, such as geometric models (also called vector graphics) or digital images (also called raster graphics). In 2D graphics, these components can be modified and manipulated by two-dimensional geometric transformations such as translation, rotation, scaling. In object oriented graphics, the image is described indirectly by an object endowed with a self-rendering method—a procedure which assigns colors to the image pixels by an arbitrary algorithm. Complex models can be built by combining simpler objects, in the paradigms of object-oriented programming. Modern computer graphics card displays almost overwhelmingly use raster techniques, dividing the screen into a rectangular grid of pixels, due to the relatively low cost of raster-based video hardware as compared with vector graphic hardware. Most graphic hardware has internal support for blitting operations and sprite drawing.

Preferably, however, the graphics generated on screen 22 are 3D. OpenGL and Direct3D are two popular APIs for the generation of real-time imagery in 3D. (Real-time means that image generation occurs in 'real time', or 'on the fly') Many modern graphics cards provide some degree of hardware acceleration based on these APIs, frequently enabling the display of complex 3D graphics in real-time. However, it's not necessary to employ any one of these to actually create 3D imagery. The graphics pipeline technology is advancing dramatically, mainly driven by gaming applications enabling more realistic 3D synthetic renderings of FIGS. 1-5.

3D graphics have become so popular, particularly in computer games, that specialized APIs (application programmer interfaces) have been created to ease the processes in all stages of computer graphics generation. These APIs have also proved vital to computer graphics hardware manufacturers, as they provide a way for programmers to access the hardware in an abstract way, while still taking advantage of the special hardware of this-or-that graphics card.

These APIs for 3D computer graphics are particularly popular:

OpenGL and the OpenGL Shading Language
OpenGL ES 3D API for embedded devices
Direct3D (a subset of DirectX)
RenderMan
RenderWare
Glide API
TruDimension LC Glasses and 3D monitor API There are also higher-level 3D scene-graph APIs which provide additional functionality on top of the lower-level rendering API. Such libraries under active development include:

QSDK
Quesa
Java 3D
JSR 184 (M3G)
NVidia Scene Graph
OpenSceneGraph
OpenSG
OGRE
Irrlicht
Hoops3D Photo-realistic image quality is often the desired outcome, and to this end several different, and often specialized, rendering methods have been developed. These range from the distinctly non-realistic wireframe rendering through polygon-based rendering, to more advanced techniques such as: scanline rendering, ray tracing, or radiosity. The rendering process is computationally expensive, given the complex variety of physical processes being simulated. Computer processing power has increased rapidly over the years, allowing for a progressively higher degree of realistic rendering. Film studios that produce computer-generated animations typically make use of a render farm to generate images in a timely manner. However, falling hardware costs mean that it is entirely possible to create small amounts of 3D animation on a small processor, such as in the device 20. Driven by the game studios, hardware manufacturers such as ATI, Nvidia, Creative Labs, and Ageia have developed graphics accelerators which greatly increase the 3D rendering capability. It can be anticipated that in the future, one or more graphics rendering chips, such as the Ageia Physx chip, will be added to the device 20.

While full 3D rendering is not possible with the device 20 described herein, advances in processing and rendering capability will enable greater use of 3D graphics in the future. In a particular application, such as NASCAR, a car object and a track object (e.g., Taladega) can be rendered in advance and stored, making realistic 3D graphics possible. In 3D computer graphics, the terms graphics pipeline or rendering pipeline most commonly refer to the current state of the art method of rasterization-based rendering as supported by commodity graphics hardware. The graphics pipeline typically accepts some representation of a 3D scene as an input and results in a 2D raster image as output.

Requests

Special requests from spectators 48 can be made to the server 44, such as for streaming video of a particular scene or audio of a particular car 10, refreshment orders, memorabilia purchases, etc. This function is shown at 50, 52 in FIG. 7.

While one preferred embodiment has been described in the context of a spectator in physical attendance at a sporting event with information broadcast by radio, the use of the graphic devices 20 at remote locations is equally feasible. In another preferred embodiment more suited for remote locations, for example, the portable device 20 can be used at home while watching a sporting event on TV, with the participant location and other information streaming over the internet WiFi in the home is a preferred mode of broadcasting the information between the portable device and the network.

Using the graphic device 20 at home while watching the same sporting event on TV is believed to be the preferred embodiment for use at remote locations. However, other examples of remote location of a sporting event viewing might not be accompanied by watching TV. That is, the views of FIGS. 1-5 can be accomplished using any graphic device, including a personal computer or a cell phone. Similar to using the graphic device 20 coupled to the internet, a personal computer user can select the source or position of origination of the desired view, and the target or orientation from the source or target. Elevations, zoom, pan, tilt, etc. may be selected by the remote user as described above.

In "my view," for example, the remote location graphic device might display only information to the 3rd turn spectator for cars nearest the 3rd turn. Alternatively, the remote location spectator might want to follow a particular car continuously, e.g. follow car number 8 (or particular golfer, etc.), with selectable views (overheard, turns, stands, head, driver's view). In any of these modes, the remote location spectator could zoom, pan or tilt as described above, freeze, slow motion, replay, etc. to obtain a selected view on the graphic device.

What is claimed:

1. A system for observing a live sporting event by a user in approximately real time comprising:
    an internet connected server operable for communicating a plurality of sport participants' positions and information at the sporting event;
    a portable internet device having a graphics display accompanying the user and coupled to the server for receiving participant positions and information, operable to overlay augmented reality information on a perspective view on said graphics display of at least a portion of said live sporting event, and said graphics display being selectable by the user to display different views of the sporting event, wherein the user can observe the live event in approximately real time and can select the position of the source of said perspective view and the target of the perspective view, and the perspective view is not an overhead plan view, and wherein the augmented reality information relates to the event; and
    wherein the device is operable to authenticate with the server and the server communicates participant positions and information to the authenticated portable internet device based at least in part on the user selected source or target.

2. The system of claim 1, wherein the target of the view on the display is an orientation of the view from the user's selected source position.

3. The system of claim 1, wherein said internet device includes a processor for receiving said participant positions, the user can specify the target as a participant, and said device compares said moving participant positions with said user's selected source position, and said graphics display generates said user view from the user's selected source position to said moving participant position.

4. The system of claim 1, wherein said user view from the user's selected source position is adjustable by the user to zoom in or out.

5. The system of claim 1, wherein one of said user's different views is an overhead plan view of the venue for the sporting event.

6. The system of claim 1, wherein said user's selected source position is the position of one of the participants.

7. The system of claim 1, wherein said user's different views on said graphics display include a composition of geographic referenced datasets, including at least imagery and participant positions use virtual renderings.

8. The system of claim 7, wherein one of said user's different views includes geographic referenced positions of one or more participants overlaid said composition.

9. A method for observing a live sporting event in approximately real time comprising:
    determining multiple positions of a moving participant at the venue of the live sporting event;
    transmitting the determined positions of said participant in approximately real time to a server;
    authenticating with the server one or more portable devices accompanying one or more spectators remote from the venue, each spectator's portable device having a graphics display operable to overlay augmented reality information on a perspective view of the event, and to select different views and communicate the selected view, wherein each view comprises a source location and a target location;
    communicating participant positions from said server to an authenticated spectator's portable device based at least in part on the selected source or target; and
    viewing on the graphics display of the portable device in approximately real time a depiction of said moving participant positions on said perspective view at said venue, augmented reality information related to said event, whereby the spectator can selectively change said perspective view, and said perspective view is not an overhead plan view.

10. The method of claim 9, wherein said device includes an input mechanism for selecting said source location, and said target location is selected by selecting an orientation from said source location.

11. The method of claim 9, wherein one of said points of view being an overhead plan view of said sporting event venue.

12. The method of claim 9, wherein said participant position determining step comprises equipping a plurality of participants with a GPS receiver to determine participant position.

13. The method of claim 10, wherein said spectator can select a geo-referenced location target or orientation from the selected source location.

14. A method of viewing a live sporting event by a spectator in approximately real time comprising:
    specifying a first source position for viewing the event, and said first source position is not an overhead plan view;
    authenticating a spectator device with a server to receive participant positions;
    transmitting the position of one or more participants at said sporting event to said server and communicating said participant positions to said authenticated spectator device in approximately real time;

specifying a first target position;

rendering on said authenticated spectator device having a graphics display a graphical depiction of said one or more participant positions at said sporting event, and including augmented reality information on a perspective view on said display of at least a portion of said sporting event;

viewing the graphical depiction in approximately real time in a first perspective view from said first source position to said first target position; and selectively changing the first view of said graphical depiction on said spectator device from said first view to another view, wherein each view comprises a source position and target position.

15. The method of claim 14, wherein said graphical depiction comprises a background composition of imagery, and virtual renderings with said one or more participant positions superimposed in geo-referenced relation to said imagery.

16. The method of claim 14, wherein changing the view of said graphical depiction comprises rotating the depiction in a vertical axis to a tilt view.

17. The method of claim 14, the one or more participant positions are received over the internet.

18. The method of claim 14, wherein changing the view of said graphical depiction comprises specifying said target as a moving participant and changing the view as the location of said participant changes.

19. The system of claim 6, wherein the source position is a participant position, and said perspective view is from said source participant to a target comprising the position of another participant.

20. The system of claim 6, wherein said perspective view is to said target and said source is selected as an orientation from the target.

21. The system of claim 1, wherein said internet device includes glasses worn by the user.

22. The system of claim 1, wherein said internet device comprises a window on a larger display.

23. The system of claim 1, wherein said internet device comprises a window having virtual renderings and another portion having video imagery of said sporting event.

24. The method of claim 9, wherein said depiction is a composition having at least imagery and virtual renderings.

25. The method of claim 9, wherein said depiction is imagery with augmented reality depicting said participant positions as said participant moves.

26. The method of claim 14, wherein said graphical depiction comprises video imagery with an augmented reality layer designating participant positions.

27. The method of claim 14, wherein said graphical depiction is on one portion of a display screen, and video imagery is on another portion of said display.

28. The system of claim 1, wherein at least some of said sport participants' positions are determined by GPS.

* * * * *